United States Patent
Doane

(10) Patent No.: US 6,922,483 B2
(45) Date of Patent: Jul. 26, 2005

(54) METHODS FOR MEASURING DMD LOW FREQUENCY SPATIAL UNIFORMITY

(75) Inventor: Dennis Lee Doane, Dallas, TX (US)

(73) Assignee: Texas Instruments Incorporated, Dallas, TX (US)

(*) Notice: Subject to any disclaimer, the term of this patent is extended or adjusted under 35 U.S.C. 154(b) by 504 days.

(21) Appl. No.: 09/746,102

(22) Filed: Dec. 21, 2000

(65) Prior Publication Data

US 2001/0031078 A1 Oct. 18, 2001

Related U.S. Application Data

(60) Provisional application No. 60/173,286, filed on Dec. 28, 1999.

(51) Int. Cl.[7] .................................................. G06K 9/00
(52) U.S. Cl. .................... 382/149; 348/383; 353/33; 353/69; 356/139.07; 356/140; 356/147; 356/150; 356/445; 356/458; 382/148; 382/151; 606/5
(58) Field of Search .................... 356/139.07, 140, 356/147, 150; 353/33, 69; 358/463; 345/648; 348/383; 382/141–154; 606/5

(56) References Cited

U.S. PATENT DOCUMENTS

| | | | | |
|---|---|---|---|---|
| 5,442,462 A | * | 8/1995 | Guissin | 358/463 |
| 5,485,279 A | * | 1/1996 | Yonemitsu et al. | 375/240.14 |
| 5,673,151 A | * | 9/1997 | Rallison | 359/631 |
| 5,760,944 A | * | 6/1998 | Minakuchi et al. | 359/211 |
| 5,796,508 A | * | 8/1998 | Suzuki | 359/224 |
| 5,796,526 A | * | 8/1998 | Anderson | 359/671 |
| 6,016,152 A | * | 1/2000 | Dickie | 345/648 |
| 6,310,650 B1 | * | 10/2001 | Johnson et al. | 348/383 |
| 6,450,647 B1 | * | 9/2002 | Takeuchi | 353/69 |
| 6,471,356 B1 | * | 10/2002 | Gohman et al. | 353/33 |
| 6,483,641 B1 | * | 11/2002 | MacAulay | 359/385 |
| 6,485,145 B1 | * | 11/2002 | Cotton et al. | 353/69 |
| 6,508,812 B1 | * | 1/2003 | Williams et al. | 606/5 |
| 6,520,646 B2 | * | 2/2003 | Rodriguez et al. | 353/69 |

\* cited by examiner

Primary Examiner—Bhavesh M. Menta
Assistant Examiner—Gregory Desire
(74) Attorney, Agent, or Firm—Charles A. Brill; Wade James Brady, III; Frederick J. Telecky, Jr.

(57) ABSTRACT

Methods for measuring the low spatial reflectivity uniformity of a DMD spatial light modulator. These methods are unique since they compensate for the non-uniformities introduced by the tilt angle of the DMD mirrors in addition to the normal system non-uniformities introduced by the illumination source and optics. These methods flatten the image and remove all but the low spatial non-uniformities from the DMD mirrors.

13 Claims, 8 Drawing Sheets

Method 1 - Flowchart for Low Frequency DMD Uniformity Test

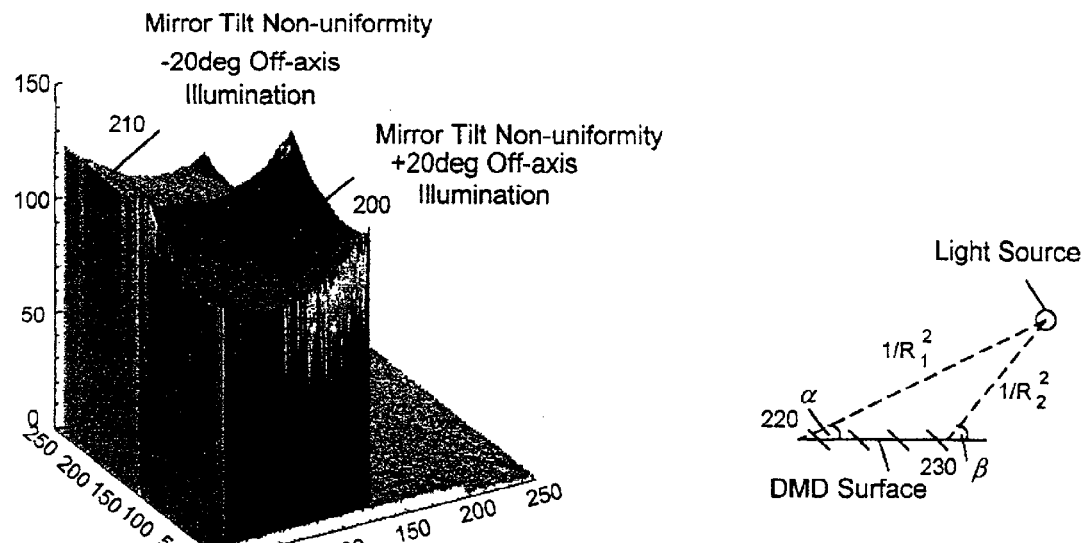
Fig. 2a
Fig. 2b
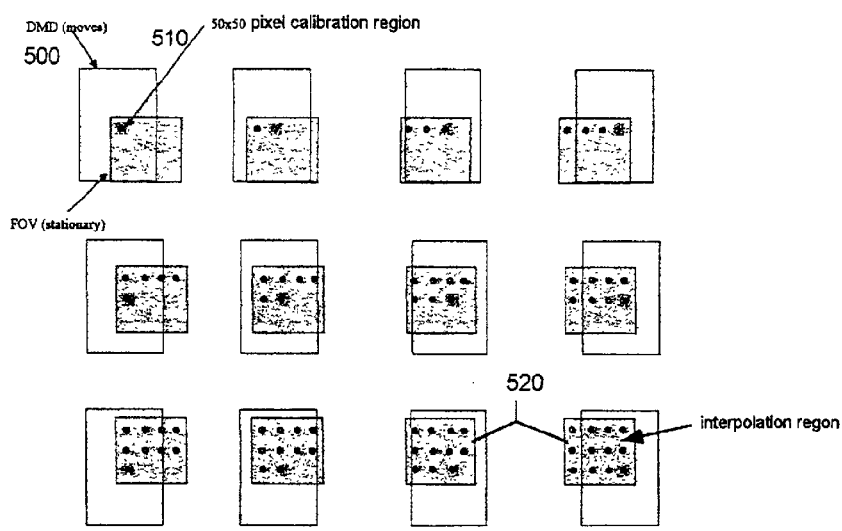
Fig. 5

Image with low frequency defect 2 nd order surface fit

Gain factor image from 2nd order fit

After gain factor is applied

Data outside limits are defects

1 = Upper limit
2 = Averge
3 = Lower limit

METHODS FOR MEASURING DMD LOW FREQUENCY SPATIAL UNIFORMITY

This application claims priority under 35 USC § 119(e)(1) of provisional application No. 60/173,286 filed Dec. 28, 1999.

BACKGROUND OF THE INVENTION

1. Field of the Invention

This invention relates to the field of spatial light modulators (SLM) and more particularly to a method for measuring the low spatial uniformity of a digital micromirror device (DMD) spatial light modulator.

2. Description of the Related Art

The automatic testing of spatial light modulators (SLM) typically involves the use of a machine vision system that includes an illumination source, optics, motion control, and appropriate test methods. These test systems exhibit a pronounced low spatial uniformity roll-off due to lighting and optics variations in the system, as well as variations in the device under test, as shown in FIG. 1. FIG. 1a shows both low frequency roll-off and high frequency defects across a portion of a horizontal line in a SLM, as identified in FIG. 1b. To locate the low spatial non-uniformities defects caused from smudges, scratches, and other defects on the surface of the mirrors and cover glass is the goal of such a test. The low frequency roll-off at the edges is typically caused by the optics and illumination source. Other high frequency, individual mirror related defects are not of interest in this test and are isolated and extracted from the test data. These machine vision test systems can be calibrated to measure and separate out the low spatial system non-uniformities from that of the SLM device under test, leaving only the low spatial reflectivity uniformity at the surface of the device as the results.

However, when the spatial light modulator under test is a deformable mirror device (DMD), an additional low spatial non-uniformity exists that is caused by the angle of the off-axis illuminating light across the device relative to the tilted mirrors. Although well established procedures for measuring the low spatial reflectivity for SLM device are known, the compensation for DMD mirror tilt angle variations are not addressed and can introduce significant errors in the test data if proper compensation is not made.

Thus there is a need for a low spatial uniformity test method(s) that includes the varying relation between the off-axis light source and the tilt angle of the DMD mirrors. The invention disclosed herein addresses this need in two embodiments.

SUMMARY OF THE INVENTION

This invention addresses the shortcomings of conventional DMD low spatial uniformity test systems by introducing test methods which removes from the test data not only the normal low spatial non-uniformity of the system's lighting and optics, but also those unique non-uniformities introduced by the DMD mirror's tilt angle. This provides test data which represents the low spatial reflectivity of the device under test.

In a first embodiment, to obtain the low spatial system non-uniformity, a small region of pixels, typically 50×50 pixels, is stepped to various regions of the device according to a grid pattern, where intensity readings are taken. It is assumed that the reflectivity of this small 50×50 pixel calibration region is constant across these small regions. A reference frame for the entire image is then generated by interpolating to fill in the data between the stepped readings and then a gain correction image is generated. The test device's input image is then multiplied by this gain correction image to remove the effects of system lighting, optics, and DMD mirror tilt angle, leaving only the DMD reflectance variations. This process is repeated for both +20° and −20° off-axis illumination.

In a second embodiments, to obtain the low spatial system non-uniformity it is assumed that none of the lighting, optics, or DMD tilt angle variation are greater than a $2^{nd}$ order effect and therefore a $2^{nd}$ order fit is made to the plane of the image to form a reference image. This reference image is formed using a least squares fit in two directions and then from this reference image a gain correction image is generated. The gain correction image is then multiplied by the test image to provide a flattened image. Any variation from the average in this flattened image represents low spatial non-uniformities in the test device.

When testing DMD uniformity, a test image is required for every device since the mirror tilt angle is device dependent, as compared to the lighting and optics uniformity that are system dependent.

Due to the size of a typical device, the data is taken in smaller frames and then stitched together to form the reference image. The discontinuities at the boundaries of the multiple frames are removed by filtering out the effects of system and tilt angle lighting attenuation.

DESCRIPTION OF THE VIEWS OF THE DRAWINGS

The included drawings are as follows:

FIG. 2a is the results of the effects of mirror tilt angle variations on the DMD low spatial uniformity for both +20° and −20° off-axis illumination.

FIG. 2b illustrates the varying angle across the DMD for the off-axis illumination.

FIG. 5 is map illustrating how data is recorded in generating the reference image used in the test method for embodiment 1 of this invention.

FIG. 9b is a plot of a $2^{nd}$ order surface fit to the test image of FIG. 9a.

DETAILED DESCRIPTION

Figure 1A:
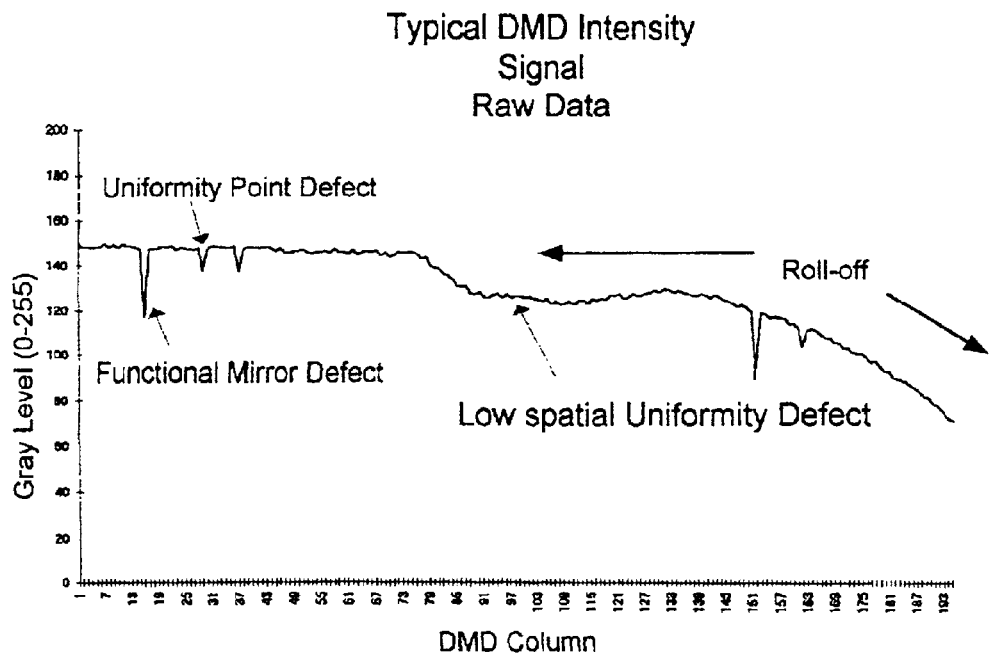
FIG. 1a is a plot of the low spatial uniformity for a typical SLM. Prior art
Figure 1B:
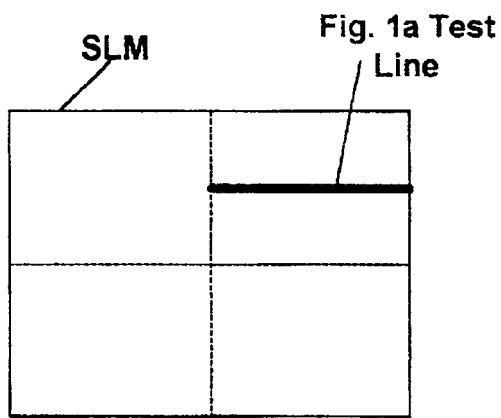
FIG. 1b is a map of a SLM indicating the test area where the line data of FIG. 1a was taken.

Slow changes in intensity across a DMD are not readily observed by the viewer. In fact, for a projected image it is desirable to have a percentage of intensity roll-off at the edges and corners of the picture to a dark hole in the center of the picture. However, it is desirable to maintain excellent uniformity at the surface of the DMD mirrors and to accomplish this desired system intensity roll-off by means of the inherent roll-off in the lighting and optics used in the test system. Two test methods for determining the low spatial of the mirror reflectivity across a DMD are disclosed herein. Both of these methods correct for variations in the measuring system relating to lighting and optics (system dependent) and to the test DMD's mirror tilt angles (device dependent), so as to provide an accurate measurement of the test device's reflectivity uniformity.

Since the goal of the test is to measure the reflectivity uniformity, the lighting, optics, and mirror tilt angle uniformity effects must be compensated for during the test. The test system consists of a bi-directional illumination source, an optical sub-system, a high-resolution digital camera, a stepper, and a machine vision system. The system is used to capture DMD images and correct for non-uniformities associated with the lighting and optics of system, as well as for any non-uniformities which are a function of the varying angle between the off-axis light source and the tilted mirror's surface. This mirror tilt angle parameter is unique to DMD's as compared to other SLM's. Although the system non-uniformities are constant, those variations caused by the tilt angles of the mirrors are device dependent. This makes it necessary to run a calibration image for every DMD that is tested.

As mentioned above, a parameter that is unique to a DMD and effects the uniformity measurement thereof if not compensated for is the relationship between the off-axis light source and the surface of the tilted mirrors. FIG. 2a illustrates this non-uniformity for the bi-directional light; e.g., for light coming from both +20° 200 and −20° 210 relative to the flat surface of the DMD under test. Since the light is striking the DMD mirrors from an off-axis direction, it will strike the mirrors at a slightly different angles across the device, as illustrated in FIG. 2b; i.e.; the light striking the surface at the left side of the device has a slightly different angle ($\alpha$) 220 from that at the right side of the device ($\beta$) 230. This introduces a gradual slope to the reflectance parameter of the DMD. An inverse square roll-off is also present due to the varying distance from the light source of each mirror in the SLM array. In the plot of FIG. 2a, the X-axis and Y-axis represents rows and columns of DMD pixels, respectively, while the Z-axis represents the quantized intensity gray levels. As shown, this effect is quite pronounced and has to be dealt with in order to obtain meaningful uniformity measurements of the device's reflectance.

Figure 3A:
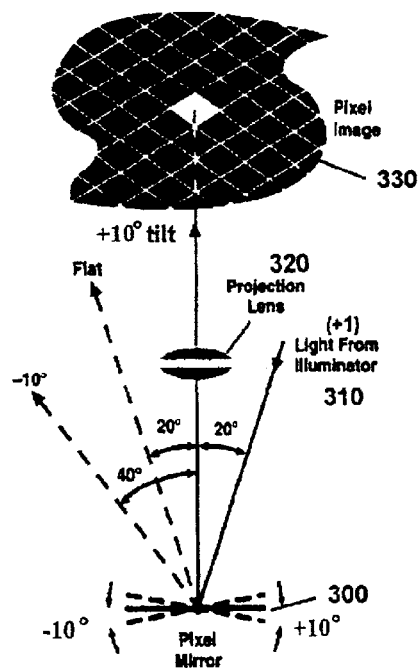
FIGS. 3a and 3b are schematics of the bi-directional off-axis illumination and optics system used in the test method(s) of this invention.
Figure 3B:
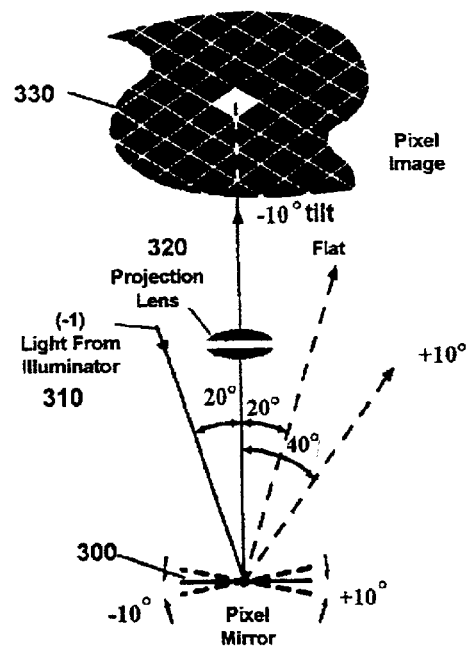

In performing the low spatial uniformity test method of this invention, light is applied bi-directionally from both +20° and then −20° relative to the flat state of the DMD mirrors. FIGS. 3a and 3b are schematic diagrams of such a bi-directional illumination source. FIG. 3a is for the case where the DMD mirrors 300 are tilted +10° (ON) and the (+1) illumination source 310 is applied from +20° off-axis, relative to the flat state (0°) of the mirrors. Light from the mirrors 300 is directed through a projection lens 320 onto a CCD imager to form the pixelated imaged 330. The reflected light from any mirrors which may be tilted −10° (OFF) or any flat surfaces on the device are reflected away from the projection lens 320 and kept out of the pixelated image 330. Of course, in performing a uniformity test all mirrors are tilted in the same direction during the test. FIG. 3b illustrates the opposite case from FIG. 3a, where the mirrors 300 are tilted −10° (OFF) and the illumination source 310 is applied from −20° off-axis, relative to the flat state (0°) of the mirrors. In both test methods disclosed below the process is described for only one of these light directions. However, in actual testing the process is repeated for both light directions.

Figure 4:
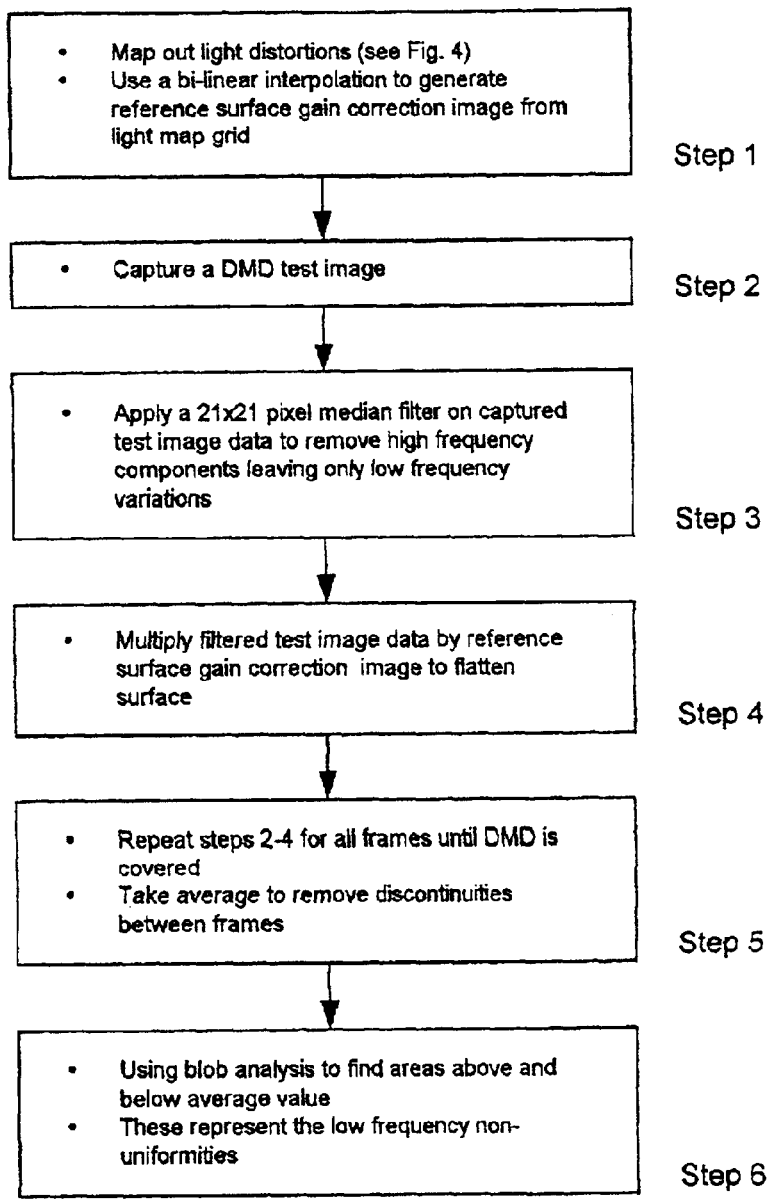
FIG. 4 is the flow chart for the DMD low spatial uniformity test method of embodiment 1 of this invention.

The test method for embodiment 1 of this invention is described in the flowchart of FIG. 4. Step 1 is to generate a reference surface gain correction map for the test device. This is used to map out the non-uniformities of the test device associated with the system optics, illumination source, and mirror tilt angle effects. This calibration or correction image is generated by stepping a small region of pixels (typically 50×50 pixels 510 located at the center of the DMD 500) in a grid pattern 520 as shown in FIG. 5, to various location in the field-of-view of the device and recording the reflectance of the small region at the different positions. Here, the small set of pixels at the center of the DMD is moved to the various locations through the optical field and data is recorded, as indicated. The number of steps in this mapping process depends entirely on the size of the DMD under test. Then the full reference surface gain correction image is generated by interpolating between the grid points. It is assumed that this small region of mirrors has a constant reflectivity and therefore any deviation in the correction image is due to lighting, optics, and mirror tilt angle non-uniformities.

In step 2, a test image is captured for the device under test. For larger devices this is accomplished in smaller frames, each of which covers a portion of the overall device.

In step 3, a median filter is applied to the captured frame of data to remove all random noise and other high frequency components, leaving only the data for low spatial frequency variations. The image is filtered by applying a 21×21 pixel smoothing filter to remove the high frequency effects of individual mirrors. The remaining image is one in which each value represents the average gray scale intensity of its surrounding 21×21 pixel region.

The data of interest in this test is that for the reflective non-uniformity of the mirrors. Therefore, in step 4 the filtered test data is multiplied by the earlier generated surface gain correction reference map to flatten the test surface. This flattened image shows only the non-uniformities due to the reflectance of the mirrors.

In step 5, the process of capturing, filtering, and flattening the test image (of steps 2–4) is repeated for each frame of the test device. These frames are then stitched together to form the overall test image and then an average of the frames is taken to remove the discontinuities between frames, leaving a flat plane.

Once this correction process is applied to the test image, the resulting image is that of the low spatial frequency uniformity of the mirrors. Variation or defects of mirror reflectivity can be caused by smudges, scratches, and particles on the surface of the device that attenuate the light.

These defects can be automatically detected by performing a "blob" analysis that is a standard procedure for typical machine vision testers.

Figure 6:
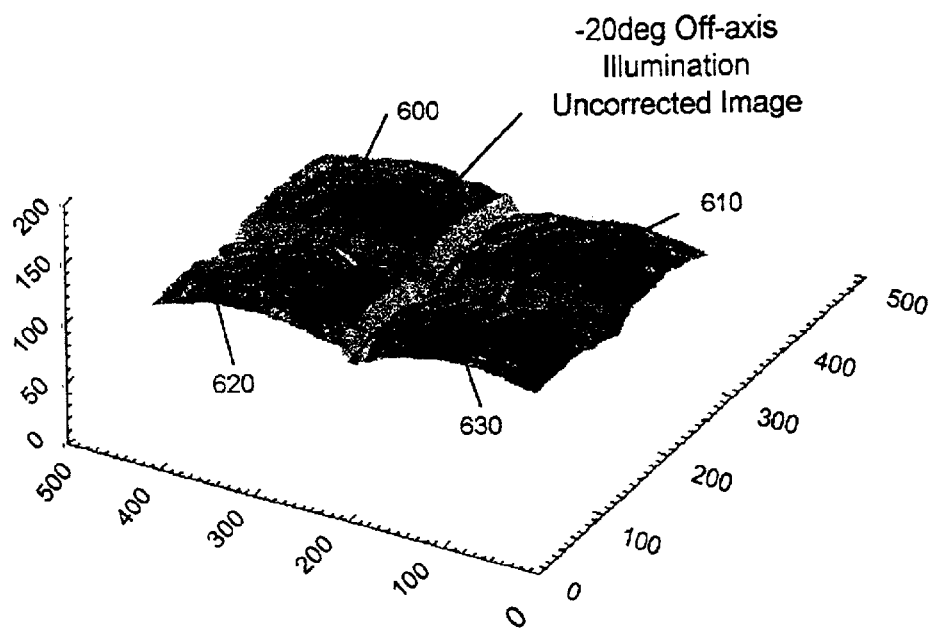
FIG. 6 is a four frame uncorrected image for the DMD low spatial uniformity test method of embodiment 1 of this invention using −20° off-axis illumination.
Figure 7:
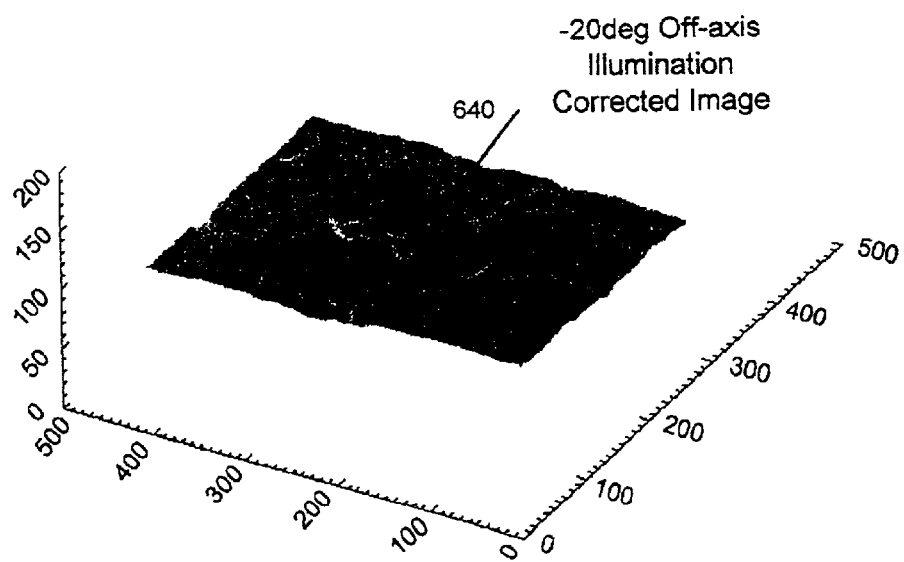
FIG. 7 is a corrected low spatial reflectivity plot for a DMD using the low spatial uniformity test method of embodiment 1 of this invention and −20° off-axis illumination.

Typical data for this test method are shown in FIGS. 6 and 7 for the case of −20° off-axis illumination. FIG. 6 shows the uncorrected data for the four frames 600–630 for a test device while FIG. 7 shows the corrected data 640. In this data the X-axis and Y-axis represent the number of horizontal and vertical pixels, respectively and the Z-axis represents the quantization levels or number of gray shades for the device. The uncorrected images clearly show the non-uniformities resulting from mirror reflectively, the roll-off at the edges from the lighting, optics, and mirror tilt angle, and the discontinuities where the four quadrants are stitched together.

A second embodiment of the invention assumes that any lighting, optical, and mirror tilt angle variations across the device can be modeled using a $2^{nd}$ order surface fit to the actual intensity profile of the device. In this embodiment, no calibration mapping step is required, but rather a reference image which is formed by laying a surface over the image using a least squares fit in two dimensions. Then a gain factor correction image is applied to the original image, which has been already been filtered to remove the high frequency components, in order to flatten the image. This method is faster than that of embodiment 1 since the light mapping correction image is not required. However, where the earlier method gave absolute results, this method produces relative results since it basically compares groups of pixels with neighboring groups.

Figure 8:
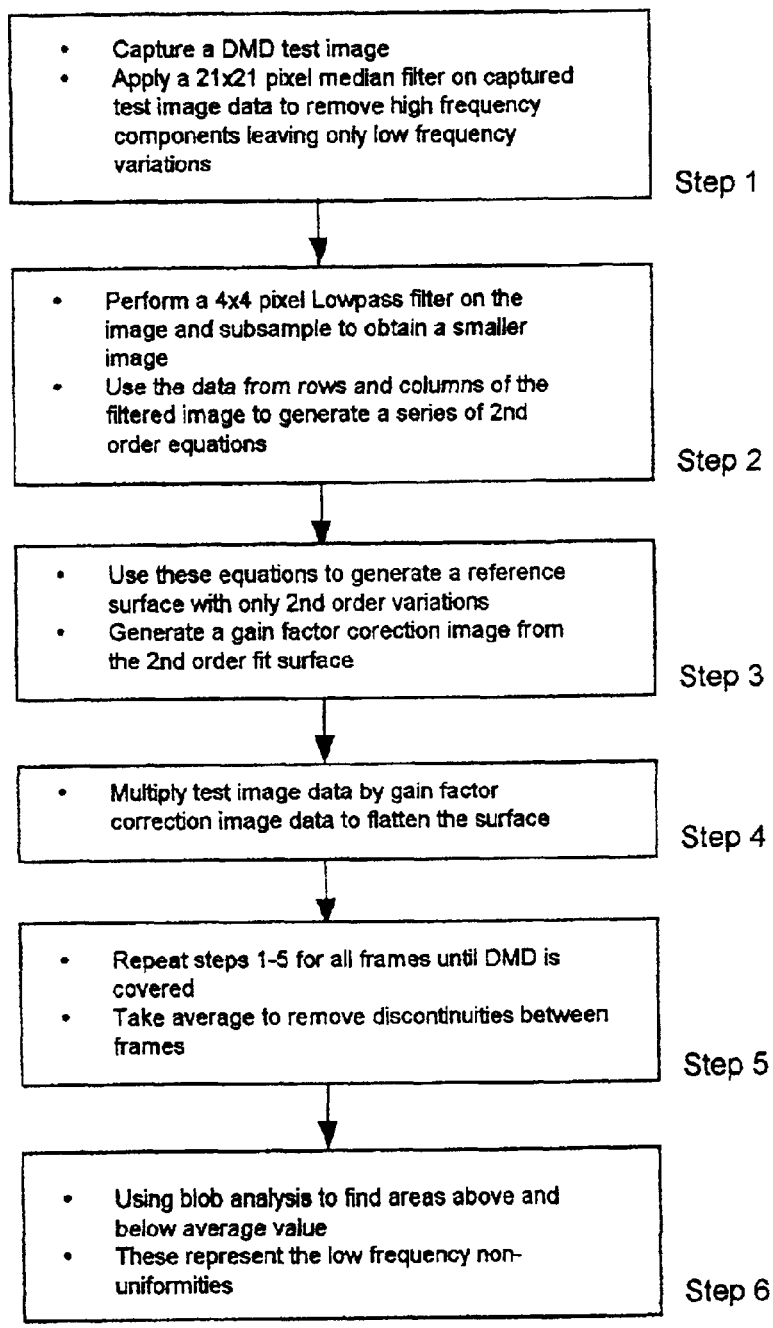
FIG. 8 is the flow chart for the DMD low spatial uniformity test method of embodiment 2 of this invention.
Figure 9A:
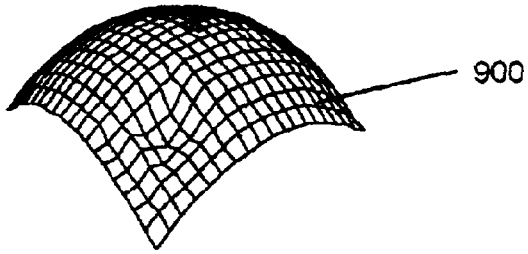
FIG. 9a is a raw data plot of a typical test image with low frequency defect as used in the method of embodiment 2 of this invention.

The test method for the second embodiment of this invention is described in the flowchart of FIG. 8. In this case, step 1 is to capture a frame of the test image. A 21×21 pixel smoothing filter is then applied to the image to remove the high frequency effects of individual mirrors. An example of a frame of captured data 900 with only the low frequency roll-off and defect showing is shown in FIG. 9a.

In step 2, a 4×4 pixel low pass filter process is performed on the captured image and this is sub-sampled to form a smaller image. Then the row and column data of the sub-sampled image is used to generate a series of $2^{nd}$ order equations. Although the sub-image is formed by taking every fourth row and column of data, it is representative of the entire image since the 4×4 pixel low pass filter was applied to the whole image.

Figure 9B:
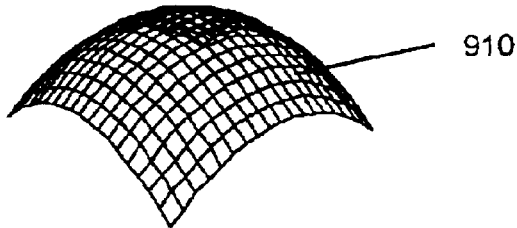
Figure 9C:
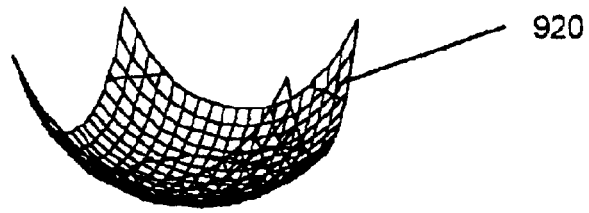
FIG. 9c is a plot showing the gain correction image generated from the $2^{nd}$ order surface fit of FIG. 9b.

In step 3, these $2^{nd}$ order equations are used to generate a reference surface 910, which fits the average surface of the test image, having only $2^{nd}$ order variations, as shown in FIG. 9b. This reference surface contains the roll-off from the optics, illumination source, and DMD mirror tilt angle, but not the low spatial non-uniformity (defect) in the original data. Next, this $2^{nd}$ order reference surface is used to generate a gain factor image 920 as shown in FIG. 9c.

Figure 9D:
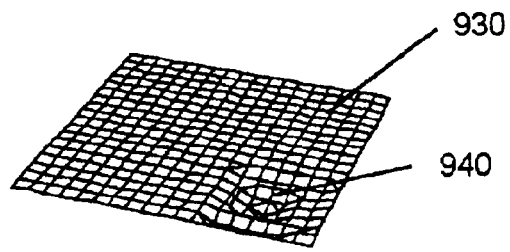
FIG. 9d is a plot of the flattened result image, with a low spatial frequency defect, after the correction image of FIG. 9c is applied to the test image.

In step 4, the gain factor image is multiplied by the test image to flatten the image 930 leaving only the low spatial frequency non-uniformities 940, as shown in FIG. 9d. The gain factor image is such that when multiplied by the test image it give a constant result everywhere except where the low spatial frequency defects reside.

In step 5, the processes of steps 1–4 are repeated for the remaining frames in the test image and then the data is stitched together and an average taken to form the overall result image.

Figure 9E:
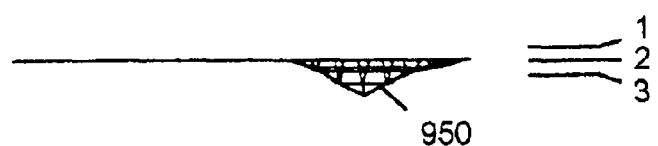
FIG. 9e illustrates the low spatial non-uniformity defect as detected using the method of embodiment 2 of this invention.

Finally in step 6, upper and lower limits are set above and below the average result image so that any data out of the range of these upper and lower limits represents low spatial uniformity defects 950, as shown in FIG. 9e. These defects include uniformity point defects (high frequency reflectivity), functional mirror defects (mechanical), low spatial uniformity defects (reflectivity), and roll-off (lighting, optics, and mirror tilt angle). The objective of the test methods of this invention is to isolate and extract all but the low spatial uniformity defects that relate to the reflectance of the DMD mirrors.

While this invention has been described in the context of two preferred embodiments, it will be apparent to those skilled in the art that the present invention may be modified in numerous ways and may assume embodiments other than that specifically set out and described above. Accordingly, it is intended by the appended claims to cover all modifications of the invention which fall within the true spirit and scope of the invention.

I claim:

1. A test method for measuring the low spatial uniformity of a DMD, comprising the steps of:

building a reference surface correction image map;

capturing a test image;

correcting said captured test image to remove DMD mirror tilt angle non-uniformities from said captured test image;

further correcting said captured test image to remove system illumination and optics non-uniformities from said captured test image;

multiplying said captured test image by said reference surface correction image map to produce a low spatial uniformity result image; and extracting low frequency non-uniformity defect data from the result image.

2. The test method of claim 1 wherein said reference surface correction image map is formed by means of a light mapping process, comprising the steps of:

stepping a small 50×50 pixel region of DMD mirrors having constant reflectivity from point to point in a grid pattern over the field of view of the test DMD;

recording the intensity data at each of said points in said grid pattern; and performing a bi-directional interpolation between said grid points in two dimensions over image to provide said reference surface correction image.

3. The test method of claim 1 wherein said captured test image is prepared by means of:

capturing said test image in smaller frames;

removing high spatial non-uniformity components using a 21×21 pixel smoothing filter;

stitching said frames together to form a full size test image; and taking average of said frames to remove said stitched image boundary discontinuities.

4. The test method of claim 1 wherein said result image is obtained for:

+20° illumination relative to 0° DMD mirror tilt angle; and

−20° illumination relative to 0° DMD mirror tilt angle.

5. The test method of claim 4 wherein said result image isolates and extracts:

high spatial frequency defects;

stitched frame boundary discontinuities;

DMD mirror tilt angle non-uniformities; and low frequency illumination source and optics non-uniformities.

6. The test method of claim 4 wherein:

said result image is flattened;

said result image consists essentially of data representing the DMD mirror reflectivity non-uniformities.

7. A test method for measuring the low spatial uniformity of a DMD, comprising the steps of:

capturing a test image;

developing a correction reference surface image which conforms to the average surface of said captured test image;

developing a gain factor correction image;

multiplying said captured test image by said gain factor correction image to provide a flattened low spatial uniformity result image; and extracting the low frequency non-uniformity defect data from said result image.

8. The test method of claim 7 wherein said captured test image is prepared by means of:

capturing said captured test image in smaller frames;

removing high spatial non-uniformity components using a 21×21 pixel smoothing filter;

stitching said frames together to form a full size test image; and taking average of said frames to remove said stitched image boundary discontinuities.

9. The test method of claim 7 wherein said result image is obtained for:

+20° illumination relative to 0° DMD mirror tilt angle; and

−20° illumination relative to 0° DMD mirror tilt angle.

10. A test method for measuring the low spatial uniformity of a DMD, comprising the steps of:

capturing a test image;

developing a correction reference surface image which conforms to the average surface of said captured test image; wherein said correction reference surface image is formed by:

performing a 3×3 pixel lowpass filtering of said test image;

sub-sampling of said filtered image to provide a representative image having fewer rows and columns;

using said representative image data to generate a set of $2^{nd}$ order equations; and using said equations to generate a reference surface having only $2^{nd}$ order variations;

developing a gain factor correction image;

multiplying said captured test image by said gain factor correction image to provide a flattened low spatial uniformity result image; and extracting the low frequency non-uniformity defect data from said result image.

11. The test method of claim 10 wherein said gain factor correction image is formed from said reference surface data; such that a flatten image plane results when said reference surface data is multiplied by said gain factor correction image data.

12. The test method of claim 10 wherein said result image isolates and extracts:

high spatial frequency defects;

stitched frame boundary discontinuities;

DMD mirror tilt angle non-uniformities; and low frequency illumination source and optics non-uniformities.

13. The test method of claim 10 wherein:

said result image is flattened;

said result image consists essentially of data representing the DMD mirror reflectivity non-uniformities.

\* \* \* \* \*